United States Patent [19]
Bail

[11] Patent Number: 6,142,251
[45] Date of Patent: Nov. 7, 2000

[54] SYSTEM CONSISTING OF AN AUTOMOTIVE VEHICLE, PREFERABLY GOLF CADDY, AND A TRANSMITTER

[76] Inventor: Gunther Bail, Am Aigen 2, 82491 Grainau, Germany

[21] Appl. No.: 08/586,919

[22] PCT Filed: Jul. 27, 1994

[86] PCT No.: PCT/DE94/00872

§ 371 Date: Jan. 23, 1996

§ 102(e) Date: Jan. 23, 1996

[87] PCT Pub. No.: WO95/03858

PCT Pub. Date: Feb. 9, 1995

[30] Foreign Application Priority Data

Aug. 3, 1993 [DE] Germany .............................. 43 26 016

[51] Int. Cl.⁷ ...................................................... B60T 7/16
[52] U.S. Cl. ........................................... 180/167; 180/168
[58] Field of Search .................................... 180/167, 168, 180/169, 6.5; 280/DIG. 5; 318/587

[56] References Cited

U.S. PATENT DOCUMENTS

| | | | |
|---|---|---|---|
| 3,720,281 | 3/1973 | Frownfelter | 318/587 |
| 3,856,104 | 12/1974 | Ohba | 180/6.5 |
| 4,023,178 | 5/1977 | Suyama | 340/385 |
| 4,109,186 | 8/1978 | Farque | 318/587 |
| 4,317,854 | 3/1982 | Terao | 180/167 |
| 4,844,493 | 7/1989 | Kramer | 180/6.5 |
| 5,076,384 | 12/1991 | Wada et al. | 180/169 |
| 5,611,406 | 3/1997 | Matsuzaki et al. | 180/167 |
| 5,711,388 | 1/1998 | Davies et al. | 180/168 |

*Primary Examiner*—Brian L. Johnson
*Assistant Examiner*—Faye M. Fleming
*Attorney, Agent, or Firm*—Pyle & Piontek

[57] ABSTRACT

An automotive golf caddy has a high frequency position finder and an ultrasonic position finder. When the caddy is placed in readiness by means of a manual transmitter, it first determines whether it receives ultrasonic signals from the manual transmitter. If that is not the case, it determines by high frequency position finding the direction of the manual transmitter and approaches the transmitter on a straight path at a relatively high speed. When the caddy enters the ultrasonic position finding range, it is automatically switched to ultrasonic position finding, follows the manual transmitter even in curves and continuously determines its distance from the transmitter. When a predetermined minimum distance is reached, the motors of the caddy are switched off. It will only follow the transmitter automatically once again when the transmitter reaches a predetermined distance from the caddy. The ultrasonic position finding allows the caddy to be accurately kept at a predetermined minimum distance from the player.

14 Claims, 2 Drawing Sheets

6,142,251

SYSTEM CONSISTING OF AN AUTOMOTIVE VEHICLE, PREFERABLY GOLF CADDY, AND A TRANSMITTER

BACKGROUND OF THE INVENTION

The present invention relates to a system consisting of an automotive vehicle, preferably a golf caddy, and a transmitter.

The present invention is not only applicable to golf carts which so far have normally been steered as hand-drawn golf carts by a player on handles and have carried the golf bag including the golf clubs, but also to other vehicles for whose purpose it may be advantageous when the vehicles can automatically follow a movable transmitter.

U.S. Pat. No. 3,742,507 and U.S. Pat. No. 4,844,493 already disclose automatic golf carts which have a position finder with the aid of which they can automatically approach an associated transmitter carried by a player. The position finder of the prior-art golf carts consists, in the one case, of a high-frequency position finder and, in the other prior-art embodiment, of an infra-red position finder, but the two finders do not offer the possibility of determining the exact distance from the associated transmitter. The prior-art golf carts are therefore not able to approach the transmitter exactly up to a predetermined distance and to stand still automatically when said minimum distance is reached until the player moves again together with the transmitter. Hence, the prior-art golf carts are not suitable in practice.

U.S. Pat. No. 4,109,186 dicloses a radio-controlled guide and speed control system for a golf caddy which comprises spaced-apart receivers to receive magnetic energy signals from a movable energy source. The received signals vary according to the positions of the receiver relative to the energy source and are electrically processed to control separated motors which drive two wheels of the golf caddy so as to start, steer and stop the same.

U.S. Pat. No. 3,748,564 discloses a remote-controlled vehicle having a right and a left drive wheel which can be driven independently of two eletric d.c. motors, the vehicle being responsive to a control signal which is supplied by a portable transmitter carried by a moving person. The vehicle has an electronic control system comprising a receiver which receives the emitted control signal and derives therefrom a distance signal which corresponds to the distance between the person and the vehicle, and a position finding signal for the course of the vehicle relative to the person. An amplifier circuit converts the distance and position finding signals into control signals for the motors of the right and left wheels.

SUMMARY OF THE INVENTION

It is the object of the present invention to develop a system consisting of an automotive vehicle, preferably, but not exclusively, a golf caddy, and of a transmitter in such a manner that the golf caddy automatically follows a transmitter and can automatically stop at a distance to be observed strictly from the transmitter. Moreover, the vehicle should be capable of approaching the transmitter automatically also in cases where the latter is positioned at an increased distance.

According to the present invention the system which is composed of vehicle and transmitter contains both a high-frequency position finder which is active whenever the distance between vehicle and transmitter exceeds a predetermined distance and whose function consists in determining the direction in which the transmitter is located when being viewed from the vehicle, and an ultrasonic position finder which determines both the direction of the transmitter and the respective distance between vehicle and transmitter, preferably with the aid of a processor, when the vehicle is within a predetermined distance from the transmitter.

The high-frequency position finder thereby enables the vehicle to approach, preferably on a straight path, the area around the transmitter in which the ultrasonic signals supplied by the transmitter at short intervals of eg. 0.5 to 1 s can be received. When the vehicle is within said range, it receives ultrasonic signals and switches from high-frequency position finding to ultrasonic position finding. Two transversely spaced-apart ultrasonic receiving means which supply the received signals to the processor mounted on the vehicle, which exactly determines the respective direction and the respective distance of the transmitter from the vehicle on the basis of the signals as received, are mounted on the vehicle for receiving ultrasonic signals. In accordance with the signals as received, the processor supplies control signals to the drive means of the vehicle, so that the vehicle continuously follows the transmitter, the vehicle also following curves predetermined by the transmitter, in contrast to the approach in the high-frequency position finding range.

When the vehicle has approached the transmitter up to a predetermined minimum distance, the control means switches off the drive means of the vehicle, and the vehicle stops automatically.

To prevent the vehicle from following every little movement of the transmitter, the control means and the processor, respectively, will only activate the vehicle again when the transmitter has moved away from the vehicle over a distance which is also predetermined.

When the vehicle according to the invention is a golf caddy, as is preferred, the golf cart should automatically stop at a distance of about 2 to 3 m from the transmitter-carrying player. The golf cart expediently follows the player whenever he has moved away from the golf cart about 5 to 6 m. The golf cart does thus not present an objectionable obstacle during a play and does not restrict the freedom of movement of the player. On the other hand, the golf clubs which are transported by the golf cart are always at hand for the player.

As already mentioned, the limit at which there is automatic switching from high-frequency position finding to ultrasonic position finding is determined by the reception range of the ultrasonic signals. This reception range extends preferably over a distance of about 10 to 20 m.

The transmitter of the automatic golf caddy system contains a start key and a stop key. When the start key is depressed, the vehicle is placed in a ready state from which it follows the transmitter automatically. To this end, the processor of the vehicle which contains the control means first determines whether the ultrasonic receiving system of the vehicle receives ultrasonic signals by which the vehicle can be controlled. If that is not the case, the control means activates the high-frequency position finder for performing a position finding operation.

In a development of the invention the vehicle may have stationarily mounted thereon a high-frequency reception antenna which is preferably oriented in the direction of travel of the vehicle. In this development, the high-frequency position finding operation is expediently performed such that the drive means of the vehicle is controlled in such a manner that it first rotates the vehicle by 360°, with the direction of the transmitter being determined either by detecting the position of the maximum of the high-frequency signal or by determining the two minimum values. Following the 360° rotation the vehicle is further rotated in the direction of the transmitter.

In an alternative development of the invention, high-frequency position finding may be performed through the Doppler effect by arranging at least three antennae which are electrically connected one after the other to the receiver.

When the direction of the transmitter has been determined and the vehicle is adjusted to said direction, the control means controls the drive means of the vehicle such that it moves in a straight line towards the transmitter. Normally, the vehicle moves into the ultrasonic position finding zone, so that it can then further approach the transmitter in the above-described manner.

However, when the transmitter moves to such an extent, while the vehicle is approaching in a straight line, that the vehicle does not move into the ultrasonic position finding zone, the control means switches off the drive means of the vehicle after a predetermined distance has been covered, whereby the vehicle is again placed in readiness by performing a renewed high-frequency position finding operation. The control means can for instance be connected to a position sensor to this end.

Normally, the automatic golf cart of the invention will follow a player such that it is always within the ultrasonic position finding zone. However, it may happen that a golfer must enter an area into which the golf cart cannot follow him, for instance a bunker or dense undergrowth. In such a case the golf cart of the invention is switched off by depressing the stop key of the manual transmitter. When the player enters again ground that is accessible to the golf cart, he will again place the golf cart in readiness by pressing the start key of the manual transmitter, and the golf cart will approach the player even over a great distance up to the set minimum distance in this ready state. Hence, the high-frequency position finder avoids the requirement that the player, in turn, approaches the golf cart up to the ultrasonic position finding zone so that the golf cart can follow the player automatically.

The golf cart according to the invention expediently comprises a free-running front wheel which is supported to pivot freely about a vertical axis, and two laterally spaced-apart rear wheels which can be driven by electric motors which are controllable independently of each other. The golf cart is steered by the rear wheels being driven at different speeds.

When the electric motors are switched off, the drive wheels of the golf cart are blocked, so that the golf cart remains reliably standing also on inclined ground.

A further great advantage is that, when approaching in a straight line, the golf cart moves in the high-frequency position finding range at a greater speed than in the ultrasonic position finding range in which the traveling speed of the vehicle can be adapted to the walking speed of a player. When the ultrasonic position finding range has been reached, the control means automatically reduces the speed.

To avoid any collision of the traveling vehicle according to the invention with people or animals who are standing in its traveling route, it should further be equipped with an infra-red detector which recognizes such heat-radiating obstacles, so that the control means can stop the vehicle in time.

The vehicle of the invention is able to approach the associated transmitter also over large distances by first moving in a straight line towards the transmitter after a high-frequency position finding operation and then by following the transmitter by means of ultrasonic position finding also in curves to stop automatically exactly when a predetermined minimum distance has been reached. When the transmitter has moved away from the vehicle over a predetermined activation distance, the vehicle will again follow the transmitter exactly up to the minimum distance which can accurately be determined by ultrasonic position finding.

BRIEF DESCRIPTION OF THE DRAWINGS

Further details of the invention will become apparent from the following description taken in conjunction with the drawing, in which.

DETAILED DESCRIPTION OF THE INVENTION

Figure 1:
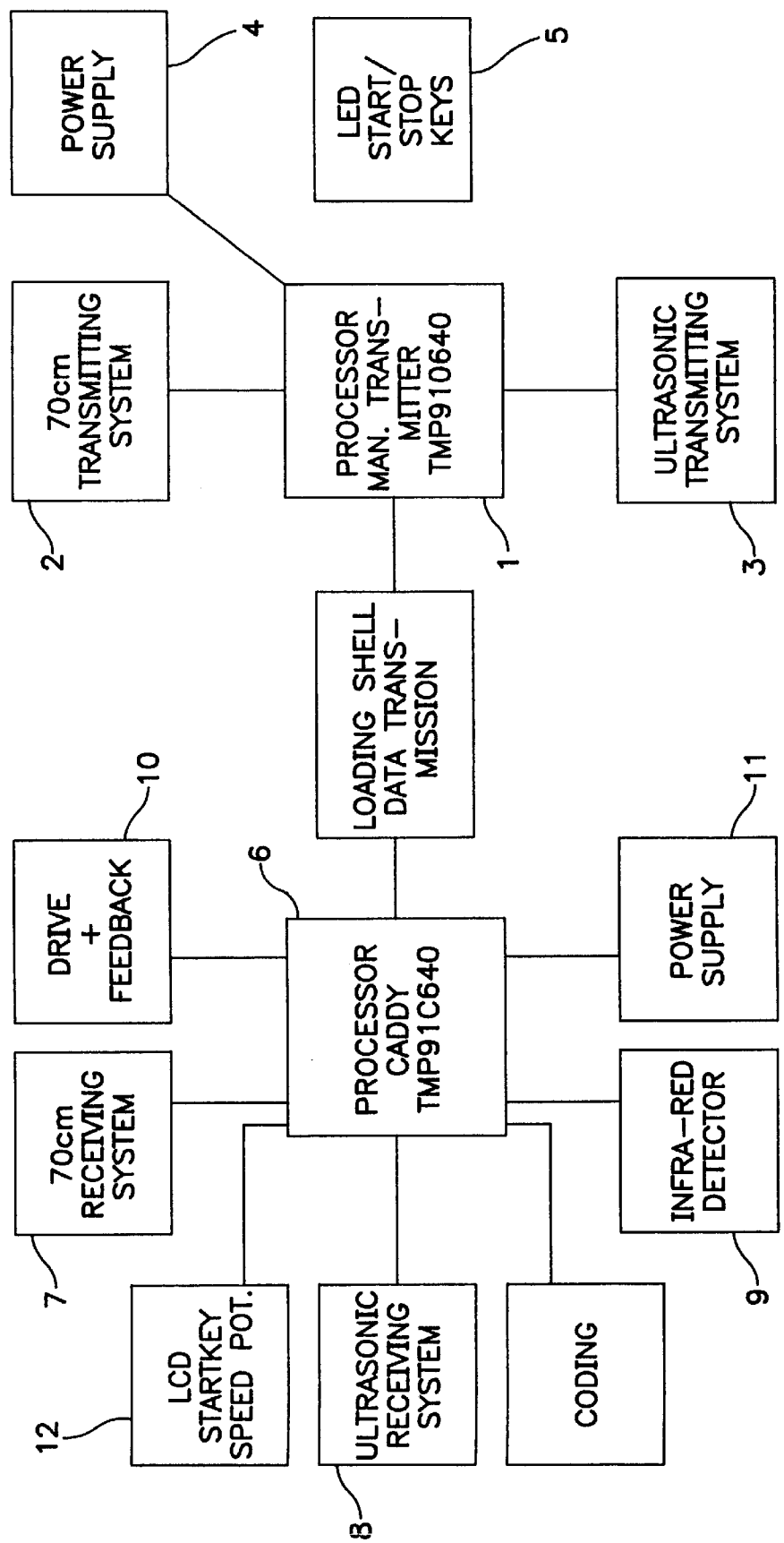
FIG. 1 survey of a golf cart system.
Figure 2:
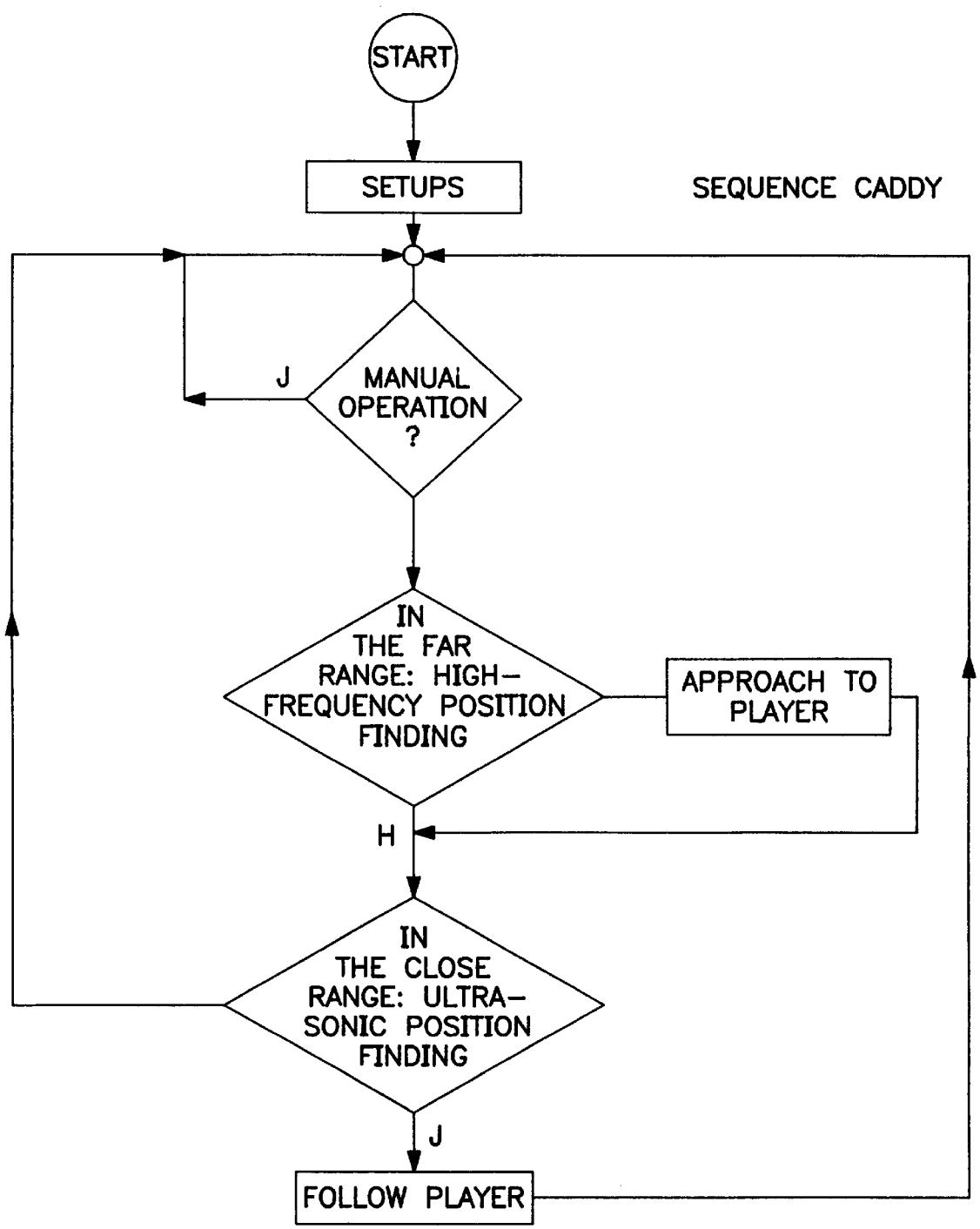
FIG. 2 is a rough flow chart of the caddy system.

FIG. 1 shows that the manual transmitter comprises a processor 1, a high-frequency transmitting system 2 of a 70 cm wavelength, an ultrasonic transmitting system 4, a power source 4 and start/stop keys 5.

The golf cart contains a processor 6, a high-frequency receiving system 7, an ultrasonic receiving system 8, an infra-red detector 9, two electric motors which are drivingly connected to the rear wheels of the golf cart, and also a power source 11.

Power is supplied by a respective accumulator for the vehicle and the manual transmitter, the two accumulators being charged via automatic charging devices.

The golf cart can be moved by operating a switch 12 and via a speed controller also independently of the transmitter in manual operation mode at any time, the cart being then steered by hand.

At any time, the golf cart can be brought via the stop key of the manual transmitter into a waiting state in which it is only movable per manual operation.

The rough flow chart illustrates that the golf cart according to the invention can be moved either in the manual operation mode or follows a player automatically; to this end, it uses high-frequency position finding in the far range and, after having approached the player, ultransonic position finding in the close range. The speed of the golf cart, the length of the minimum distance and of the distance at which the golf cart follows the transmitter, etc. can be set.

The individual components, such as processor 6, high-frequency receiving system 7, ultrasonic receiving system 8, infra-red detector, accumulator, etc. can be arranged in any expedient manner on the golf cart, this being also applicable to the components of the manual transmitter.

What is claimed is:

1. An automotive vehicle and control comprising a transmitter means for sending high frequency and ultrasonic signals to the vehicle, a drive means for said vehicle, a control means for said vehicle, a high frequency position finder means on said vehicle for determining the direction of the transmitter means at a distance exceeding a predetermined distance from said transmitter means through said high frequency signals, and an ultrasonic position finder means for determining the direction and distance of the transmitter means through said ultrasonic signals from said transmitter when the vehicle is within said predetermined distance.

2. The vehicle and control of claim 1 wherein said ultrasonic position finder means has a range corresponding to said predetermined distance.

3. The vehicle and control of claim 1 wherein the control means is responsive to signals from said ultrasonic position finder means.

4. The vehicle and control of claim 1 wherein said control means activates said high frequency position finder means when said vehicle is out of range of the ultrasonic position finder means.

5. The vehicle and control of claim 1 wherein said high frequency position finder means comprises a high frequency reception antenna mounted on said vehicle.

6. The vehicle and control of claim 1 wherein said high frequency position finder means performs a position finding operation and the drive means rotates the vehicle by at least 360 degrees.

7. The vehicle and control of claim 1 wherein said high frequency position finder means comprises at least three antennae, and means for performing a Doppler position finding operation.

8. The vehicle and control of claim 1 wherein said control means controls said drive means and causes said vehicle to move in a straight line.

9. The vehicle and control of claim 1 wherein said ultrasonic position finder means comprises a pair of ultrasonic receiving means spaced transversely across the vehicle and a processor means for continuously processing signals from said ultrasonic receiving means.

10. The vehicle and control of claim 9 wherein said processor means controls said drive means and causes the vehicle to follow said transmitter up to a predetermined minimum distance.

11. The vehicle and control of claim 1 wherein the vehicle comprises a free running front wheel, means for pivotally supporting said front wheel about a vertical axis, a pair of rear wheels, and means for independently driving the rear wheels.

12. The vehicle and control of claim 1 wherein the vehicle has a direction of travel and said vehicle additionally comprises an infrared detector mounted on said vehicle and facing in the direction of travel.

13. The vehicle and control of claim 1 wherein said vehicle comprises a golf cart.

14. An automotive vehicle and control comprising a transmitter means for sending signals to the vehicle, a drive means for said vehicle, a control means for said vehicle, a high frequency position finder means on said vehicle for determining the direction of the transmitter means at a distance exceeding a predetermined distance from said transmitter means and performing a position finding operation by rotating said drive means to rotate the vehicle by at least 360 degrees, and an ultrasonic position finder means for determining the direction and distance of the transmitter means when the vehicle is within said predetermined distance.

\* \* \* \* \*